Patented Oct. 9, 1923.

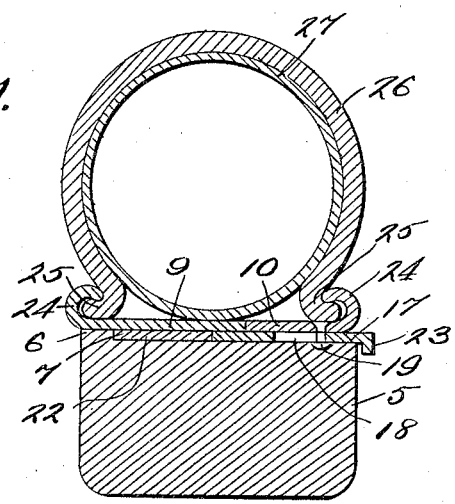

1,470,569

UNITED STATES PATENT OFFICE.

JOHN O. HINERMAN, OF ALEPPO, PENNSYLVANIA.

DEMOUNTABLE RIM.

Application filed December 12, 1919. Serial No. 344,413.

*To all whom it may concern:*

Be it known that I, JOHN O. HINERMAN, a citizen of the United States, residing at Aleppo, in the county of Greene and State of Pennsylvania, have invented certain new and useful Improvements in a Demountable Rim, of which the following is a specification.

My invention relates to improvements in demountable rims used in connection with vehicle tires and primarily aims to produce a device of this character that is simple in operation, highly efficient in use and inexpensive to manufacture.

A further object of the invention is to provide a device of this character that is divided circumferentially to form separable sections, recesses and lugs formed throughout the circumference of the inner edges of circular rings integrally secured to the sections for interlocking engagement with each other, said recesses having their main walls inclined diagonally to facilitate the locking of the sections when rotated.

A further object of the invention lies in the provision of novel means for preventing independent rotation of the sections, said means comprising a slidable key mounted in a groove extending laterally through one section, a recess for receiving the key in the opposite section, and an arm extending at right angles from the key along the outer circumferential edge of the rim for actuating the same.

Other objects and advantages of the invention will be apparent during the course of the following description.

In the accompanying drawings forming a part of this specification and in which like numerals are employed to designate like parts throughout the same, Figure 1, is a transverse section of the felly, rim, and tire parts embodying my improved feature;

Figure 2, is a fragmentary plan view of my improved rim, the two sections being disengaged, and Figure 3, is a similar view showing the rim sections locked together.

In the drawings, wherein for the purpose of illustration, I have shown a preferred embodiment of my invention, the numeral 5 represents the felly of a wheel which may be of any desired construction, but in this case has been shown with a circumferentially extending rib 6 which is formed integrally with one edge of the felly and projects slightly above the outer surface providing the wall 7.

The rim 8 which embodies my improved features, is divided circumferentially to provide the separable sections 9 and 10. These sections of the rim are of the clincher type, but various other types may be used if desired. Extending around the inner circumference of the section 9 adjacent its inner edge is a ring or band 11 that is secured thereto by rivets or other suitable means. The outer edge of the band 11 is cut out at spaced intervals throughout its circumference providing locking recesses 12, as shown in Figure 2. The lower wall of the recesses is inclined outwardly, as at 13, towards the adjacent recess forming a guide way. The cut-out portions 12 forming the locking recesses provides a locking tongue 14, the outermost point of which is on a line with the circumferential edge of the section 9. A second band 14' having its edge cut out to provide correspondingly shaped recesses 15 and locking tongues 16 is rigidly secured to the inner circumference of the section 10, being of a substantially greater width than the said section. The portion of the band which extends beyond the section will overlap the inner edge of the section 10, so that when the bands are interlocked together the rim sections will meet, forming a neat and smooth connection for the mounting of the tire.

In order to prevent independent rotation of the sections when joined together, a wedge or key 17 is mounted in a groove extending transversely through the band 14', said wedge having a slot 18 which is traversed by the pin 19. The inner end of the wedge 17 is reduced forming an extension 20 for engagement with the recess 21 formed in the enlarged portion 22 of the adjoining band 11. The outer corner of the wedge is equipped with an arm 23 which extends at right angles along the edge of the rim to provide means for actuating the said wedge. This arm is' concaved throughout its length so as to conform to the curvature of the rim 8. The outer edges of the sections 9 and 10 are curved upwardly forming continuous flanges 24 for close fitting engagement with the outwardly turned edges 25 of a tire casing 26 which encloses the inflatable inner tube 27.

In operation, the section 9 is placed upon the felly 5 of the vehicle wheel in such a position that the enlarged portion 22 abuts with the wall 7 of the upwardly extending flange 6 which is formed integral about the circumferential edge of the felly. The other section 10 is then placed upon the felly and after the tire 26 has been placed in position the two sections 9 and 10 are drawn together by rotating the same in opposite directions to each other in order to interlock the tongues 14 and 16 in the recesses 12 and 15, respectively. This operation is facilitated by the inclined walls 13 forming a guide way for the movement of the locking members. After the members have been brought into locked engagement the wedge or key 17 is moved transversely by the actuating member 23 until the projection 20 engages the recess 21, thus locking the sections against independent rotation of each other. To remove the tire the locking key is withdrawn from its locked position and by revolving the sections 9 and 10 in opposite directions the sections will be automatically separated. Particular attention is called to the manner in which the locking members have been formed, so that when the two sections 9 and 10 of the rim are joined together, a smooth surface will be provided for the mounting of the inner tube thereon.

It is to be understood that the form of my invention herewith shown and described, is to be taken as a preferred example of the same, and that certain changes in the shape, size, and arrangement of parts may be resorted to without departing from the spirit of the invention or the scope of the subjoined claim.

Having thus fully described my invention, I claim:—

A demountable rim comprising a body portion divided circumferentially to provide two parallel sections, a circular band fixedly secured to the underside of each section, recesses formed at intervals along the adjoining edges of the bands, one of said bands extending beyond the inner edge of the section to which it is attached and overlapping the adjacent section to provide a smooth joint between the sections when the recesses of the bands are interlocked, inclined guideways leading to the recesses to facilitate the interlocking of the recesses when the sections are rotated, and means slidable transversely of one of the circular bands for engagement with the circular band carried by the adjoining section for locking the two sections against independent movement.

In testimony whereof, I have affixed my signature in the presence of two witnesses:

JOHN O. HINERMAN.

Witnesses:
 FRANKIE McVAY,
 MYRA McVAY.